United States Patent [19]

Bremer, Jr.

[11] 4,200,004
[45] Apr. 29, 1980

[54] ZERO SLIP TORSIONAL VIBRATION DAMPER

[75] Inventor: Robert C. Bremer, Jr., Brownsburg, Ind.

[73] Assignee: Wallace Murray Corporation, New York, N.Y.

[21] Appl. No.: 20,859

[22] Filed: Mar. 15, 1979

[51] Int. Cl.$^2$ ............................................. F16F 15/10
[52] U.S. Cl. ................................................... 74/574
[58] Field of Search .............. 63/1 V, 27 NM; 74/574

[56] References Cited

U.S. PATENT DOCUMENTS

| | | | |
|---|---|---|---|
| T973,005 | 8/1978 | Shyu et al. | 74/574 |
| 2,824,467 | 2/1958 | O'Connor | 74/574 |
| 2,838,955 | 6/1958 | Burch | 74/574 |
| 3,196,710 | 7/1965 | Peirce | 74/574 |
| 3,410,369 | 11/1968 | Ishizuka | 74/574 X |
| 3,440,899 | 4/1969 | McGavern et al. | 74/574 |
| 3,495,475 | 2/1970 | Rumsey | 74/574 |
| 3,678,782 | 7/1972 | Aoki | 74/574 |
| 3,986,411 | 10/1976 | Kirby | 74/574 |
| 3,992,963 | 11/1976 | Khanna | 74/574 |
| 4,046,230 | 9/1977 | Troyer | 74/574 X |

FOREIGN PATENT DOCUMENTS

| | | | |
|---|---|---|---|
| 650923 | 10/1962 | Canada | 74/574 |
| 675483 | 12/1963 | Canada | 74/574 |
| 736808 | 9/1955 | United Kingdom | 74/574 |
| 814062 | 5/1959 | United Kingdom | 74/574 |

*Primary Examiner*—Leslie Braun
*Attorney, Agent, or Firm*—Thomas J. Greer, Jr.

[57] ABSTRACT

A torsional vibration damper of the type having an inertia ring coupled to a hub by means of an elastomer member. The hub is attached to a shaft subject to torsional vibrations. The radially outermost portion of the elastomer carries angularly spaced pockets into which a damping liquid of high viscosity is placed. The specific improvement resides in thickening the radially innermost portion of the elastomer, relative to the radially outermost portion. In assembling the damper, the radially innermost elastomer portions are compressed, while the portions of lesser thickness are not compressed. A thin film of viscous liquid is adjacent the elastomer portions of lesser thickness, and thus functions as a viscous damper, while the thicker elastomer portions function to elastically dampen torsional vibrations.

7 Claims, 2 Drawing Figures

ZERO SLIP TORSIONAL VIBRATION DAMPER

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, sub-class 574 in the United States Patent Office. Torsional vibrations may be considered as back-and-forth twistings of the crankshaft of an internal combustion engine, super-imposed upon the main, uni-directional rotation of the crankshaft. Unless controlled, such torsional vibrations will often lead to failure of the crankshaft, as well as contributing to failure in other parts of the engine or its cooling system, particularly where one of the resonant frequencies of the crankshaft coincides with the particular firing frequency of the engine or a particular harmonic of that frequency. According to present theory of elastomer vibration dampers, a portion of the torsional vibrational energy transmitted to the crankshaft by the action of the pistons is converted into heat in the elastomer. The elastomer may accordingly be considered as a drain or sump which continually receives a portion of the energy which causes torsional vibrations.

As an internal combustion engine is operated at various engine speeds, several vibrational frequencies appear on the crankshaft. In general, most automotive and diesel engines of present design which do not utilize a torsional vibration damper have one fairly high amplitude resonant frequency within the engine operating range of speeds. However, at any given engine speed, torsional vibrations from various orders of vibration are present and can be significant.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 rpm simultaneously executed angular vibrations of an amplitude of from one-fourth degree to one degree at a frequency of 150 to 250 cycles per second.

It is well known in this art that viscous damping of torsional vibrations may be carried out, either alone or in combination with elastomer damping of torsional vibrations. One example of a damper displaying both elastomer and viscous damping is described in U.S. Pat. No. 3,440,899 issued to McGavern. In that construction, a pair of annular elastomer members, is provided with a plurality of angularly spaced cavities or pockets which are filled with a viscous damping liquid. The McGavern damper exhibits both elastic and viscous damping.

One difficulty observed in the performance of a damper of the McGavern type is that slippage between the elastomer and either the inertia ring or the hub or both is sometimes observed under heavy torsional loads and forces. Further, high fluid pressures in the pockets or cavities carrying the viscous damping liquid, caused by rubber deformation under high loads, cause wear of the elastomer member. In accordance with the practice of this invention, these problems are substantially alleviated. In carrying out the invention, the interface between the elastomer and the hub disc is bonded to preclude slippage, usually by means of a pre-vulcanization load. The radially innermost portion of the elastomer member within the annular cavity of the inertia ring is made wider than the annular cavity, prior to assembly. Thus, after assembly, the radially innermost portion of the elastomer within the cavity is compressed. Further, the radially outermost portion of the elastomer in the annular cavity is made of a dimension less than or equal to the thickness, measured axially, of the annular cavity. In this manner, an annular space is defined at the sides of this part of the elastomer for the reception of a quantity of viscous damping liquid. A film of the damping liquid thus covers the radially outermost faces of the elastomer within the annular cavity. The pockets act as a kind of reservoir for the damping liquid. No slippage between the drive disc or hub and the elastomer is likely to occur, as in McGavern, because there is no liquid at disc-elastomer interface. In McGavern, the damping liquid tended to flow out of the liquid pockets, into the disc-elastomer interface. Thus, the compression force can not be made greater at the disc-elastomer interface, i.e., no slippage. As a direct consequence of increased compression, the ability of deleterious vapors, fumes, and foreign particles to enter the interface between the hub and elastomer and between the inertia ring and elastomer is lessened. By virtue of this construction the radially outermost portion of elastomer in the annular cavity, with its associated film of viscous liquid, functions as a viscous damper, and the radially innermost, compressed, elastomer in the annular cavity functions as a torsional spring to elastically dampen torsional vibrations.

Figure 1:
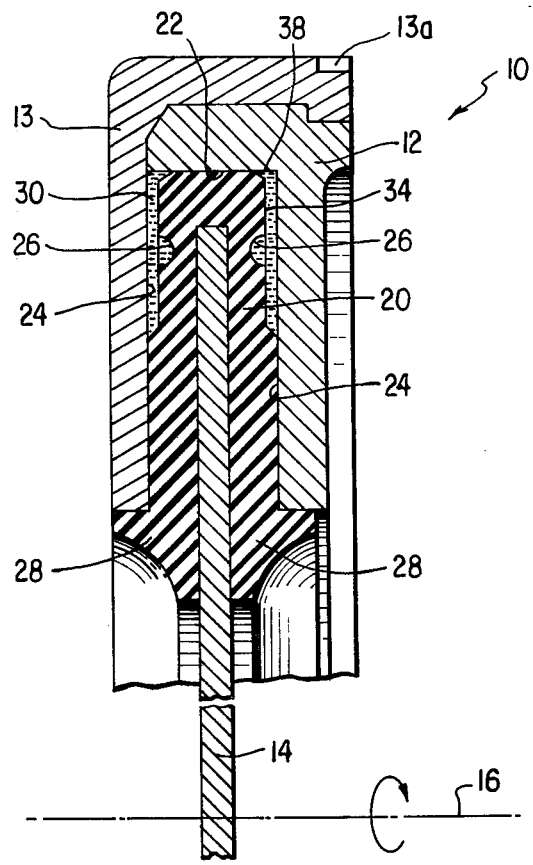
FIG. 1 is a half-axial, upper longitudinal cross-sectional view of a torsional vibration damper formed in accordance with this invention.

Referring now to the drawings, the numeral 10 denotes a torsional vibration damper in accordance with this invention, the damper including an inertia member or inertia ring of generally U-cross-section comprised of parts 12 and 13. Retainer cup 13 is crimped at 13a as by rolling. The numeral 14 denotes a hub, here shown in the form of a disc, the hub adapted to be coupled to the crankshaft of an internal combustion engine rotating about an axis denoted by the numeral 16. The manner of attaching the hub 14 to the crankshaft is well known in this art and need not be described. The numeral 20 denotes an elastomer member, also of generally U- shaped in cross-section, and fitting into an annular recess or cavity in the inertia ring 12, the cavity being defined by outer wall portion 22 and side walls 24. The numeral 26 denotes any one of a plurality of angularly disposed pockets or cavities in the sides of the radially outermost portion of the elastomer 20. The numeral 28 denotes a slinger seal integral with the elastomer 20 and positioned at the radially innermost portion of the elastomer. The slinger seal includes portions of an axial extent sufficient to cover the entrance to the annular cavity 22, 24, the portions 28 thus protecting the innermost or working elastomer from corrosive fumes, vapors and the like.

The numeral 30 denotes any one of two viscous damping liquid films on and associated with the side faces of the radially outermost portions of the elastomer 20, the cavities 26 communicating with the film. The radially outermost portion 34 of elastomer 20 (see FIG. 2) is uncompressed in the assembly shown at FIG. 1, the clearance between these sides and the facing walls 24 of inertia ring 12 defining the annular space for viscous damping liquid 30.

Figure 2:
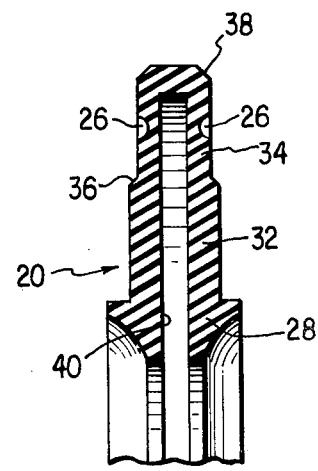
FIG. 2 is a similar view, but showing the elastomer member only prior to its insertion in the annular cavity of the inertia ring of FIG. 1.

FIG. 2 of the drawings illustrates the configuration of the elastomer member 20 prior to assembly into the cavity 22, 24 of inertia ring 12. A consideration of FIG. 2 shows that the radially innermost portion 32 of the elastomer is of a greater axial extent, i.e., thicker, than the radially outermost portion 34. Bevel ridges 36 of approximately 45° join the outer surface of portions 32 and 34. The numeral 38 denotes bevels which may conveniently be placed in the radially outermost portion of the corners of the elastomer members 20.

During assembly, the hub 14 is adhesively bonded to the walls of continuous annular slot 40 in the interior of elastomer member 20. Similarly, the sides of portions 32 may be adhesively bonded to corresponding faces of surfaces 24 of inertia ring 12. The damping liquid, usually a silocone liquid, is placed in the pockets 26, and also spread on the side walls of elastomer portion 34. The two inertia ring parts 12, 13 are now assembled, with the outer rim of the elastomer 20 contacting, abutting, and being slightly compressed by wall portion 22. The bevel rims 38 shown at FIG. 2 are slightly compressed in assembly, as shown at FIG. 1. To further maintain the assembly, the retainer cup 13 is crimped at one or more radial portions 13a thereof, as by rolling.

What is claimed is:

1. A torsional vibration damper of the type including an inertia ring coupled to an annular hub by means of an annular elastomer member, the inertia ring having an annular cavity which receives the radially outermost portion of the hub, the hub extending into an annular slot within the elastomer member, the elastomer member also being positioned in the annular cavity and being sandwiched by the inertia ring and the hub, the improvement comprising, the radially innermost portion of the elastomer in the annular cavity being under compression, the radially outermost portion of the elastomer in the annular cavity being uncompressed, a film of viscous liquid on at least one side of the radially outermost portion of the elastomer; whereby the radially outermost portion of elastomer in the annular cavity with its associated film of viscous liquid functions as a viscous damper, and whereby the radially innermost, compressed elastomer in the annular cavity functions as a torsional spring.

2. The torsional vibration damper of claim 1 wherein said at least one side of the said radially outermost elastomer portion are provided with pockets, the pockets containing said viscous liquid, the pockets opening to and communicating with the film of viscous liquid.

3. The torsional vibration damper of claim 2 wherein the said pockets open only to said elastomer sides adjacent the said liquid film.

4. The torsional vibration damper of claim 1 wherein a film of said viscous liquid covers both sides of said radially outermost portion of the elastomer.

5. The torsional vibration damper of claim 1 wherein the radially outermost surface of the said annular elastomer member contacts and abuts the radially outermost surface of the said annular cavity in the inertia ring.

6. The torsional vibration damper of claim 1 wherein the said radially innermost elastomer portion is, prior to final assembly of the damper, thicker in an axial direction than the said radially outermost elastomer portion.

7. The torsional vibration damper of claim 1 wherein said elastomer member is of U-shape in half-axial cross-section the sides of the U defining said continuous annular slot sandwiching the said hub portion received therebetween.

* * * * *